United States Patent
Li et al.

(10) Patent No.: US 10,924,731 B2
(45) Date of Patent: Feb. 16, 2021

(54) COMPLEXITY CONSTRAINTS ON MERGE CANDIDATES LIST CONSTRUCTION

(71) Applicant: TENCENT AMERICA LLC, Palo Alto, CA (US)

(72) Inventors: Xiang Li, Los Gatos, CA (US); Jing Ye, San Jose, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/530,434

(22) Filed: Aug. 2, 2019

(65) Prior Publication Data

US 2020/0077084 A1 Mar. 5, 2020

Related U.S. Application Data

(60) Provisional application No. 62/735,001, filed on Sep. 21, 2018, provisional application No. 62/723,932, filed on Aug. 28, 2018.

(51) Int. Cl.
*H04N 19/105* (2014.01)
*H04N 19/176* (2014.01)
*H04N 19/513* (2014.01)

(52) U.S. Cl.
CPC ......... *H04N 19/105* (2014.11); *H04N 19/176* (2014.11); *H04N 19/513* (2014.11)

(58) Field of Classification Search
CPC ... H04N 19/105; H04N 19/513; H04N 19/176
See application file for complete search history.

(56) References Cited

U.S. PATENT DOCUMENTS

| 10,511,852 B1 * | 12/2019 | Xu | H04N 19/513 |
| 2012/0320984 A1 * | 12/2012 | Zhou | H04N 19/463 |
| | | | 375/240.16 |

(Continued)

OTHER PUBLICATIONS

International Search Report dated Nov. 15, 2019 in International Application No. PCT/US2019/046674.

(Continued)

*Primary Examiner* — Zaihan Jiang
(74) *Attorney, Agent, or Firm* — Sughrue Mion, PLLC

(57) ABSTRACT

A method of performing merge candidate list construction for video coding using at least one processor includes determining a plurality of potential merge candidates; selecting a first potential merge candidate from among the plurality of potential merge candidates; performing a redundancy check by checking the potential merge candidate against a merge candidate included in the merge candidate list; based on a result of the redundancy check, determining whether to insert the potential merge candidate into the merge candidate list; determining whether a redundancy check threshold is exceeded, wherein the redundancy check threshold relates to at least one from among a number of redundancy checks which have been performed, and a number of potential merge candidates which have been checked by the redundancy checks; and based on the redundancy check threshold being exceeded, determining not to perform additional redundancy checks during the merge candidate list construction.

18 Claims, 9 Drawing Sheets

(56) References Cited

U.S. PATENT DOCUMENTS

| | | | |
|---|---|---|---|
| 2013/0003850 A1* | 1/2013 | Sugio | H04N 19/147 |
| | | | 375/240.16 |
| 2013/0070854 A1 | 3/2013 | Wang et al. | |
| 2014/0146876 A1* | 5/2014 | Takehara | H04N 19/109 |
| | | | 375/240.02 |
| 2014/0233651 A1* | 8/2014 | Nakamura | H04N 19/51 |
| | | | 375/240.16 |
| 2014/0376638 A1* | 12/2014 | Nakamura | H04N 19/139 |
| | | | 375/240.16 |
| 2015/0085930 A1* | 3/2015 | Zhang | H04N 19/136 |
| | | | 375/240.15 |
| 2015/0281708 A1 | 10/2015 | Chuang et al. | |
| 2017/0127041 A1 | 5/2017 | Bang et al. | |
| 2017/0310984 A1 | 10/2017 | Lee et al. | |
| 2017/0310990 A1 | 10/2017 | Hsu | |
| 2018/0310017 A1* | 10/2018 | Chen | H04N 19/593 |
| 2018/0359483 A1* | 12/2018 | Chen | H04N 19/44 |
| 2019/0200040 A1* | 6/2019 | Lim | H04N 19/583 |
| 2020/0007889 A1* | 1/2020 | Chao | H04N 19/52 |
| 2020/0053379 A1* | 2/2020 | Han | H04N 19/52 |
| 2020/0059658 A1* | 2/2020 | Chien | H04N 19/176 |

OTHER PUBLICATIONS

Written Opinion of the International Searching Authority dated Nov. 15, 2019 in International Application No. PCT/US2019/046674.

"High Efficiency Video Coding", Series H: Audiovisual and Multimedia Systems Infrastructure of audiovisual services—Coding of moving video, Telecommunication Standardization Sector of ITU, Rec. ITU-T H.265v4, Dec. 2016, 664 pages.

Benjamin Bross et al., "Versatile Video Coding (Draft 2)", Joint Video Experts Team (JVET) of ITU-T SG 16 WP 3 and ISO/IEC JTC 1/SC 29/WG 11, JVET-K1001-v7, Jul. 10-18, 2018, 140 pages.

Haitao Yang et al., "Description of CE4: Inter prediction and motion vector coding", Joint Video Experts Team (JVET) of ITU-T SG 16 WP 3 and ISO/IEC JTC 1/SC 29/WG 11, JVET-J1024r2, Apr. 10-20, 2018, 46 pages.

\* cited by examiner

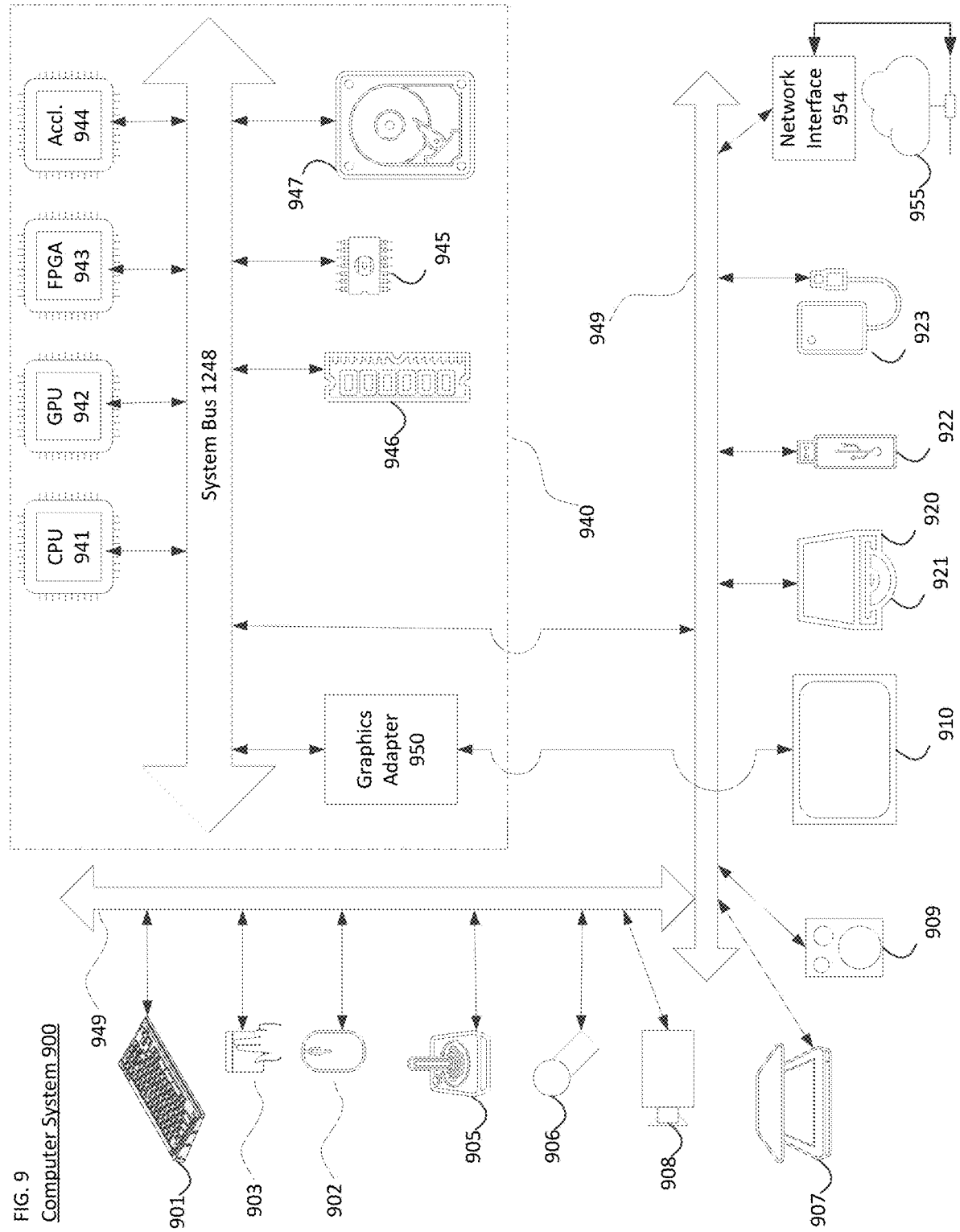

COMPLEXITY CONSTRAINTS ON MERGE CANDIDATES LIST CONSTRUCTION

CROSS-REFERENCE TO RELATED APPLICATION

This application claims priority from U.S. Provisional Patent Application No. 62/723,932, filed on Aug. 28, 2018, and U.S. Provisional Patent Application No. 62/735,001, filed on Sep. 21, 2018, in the United State Patent and Trademark Office, the disclosures of which are incorporated herein by reference in their entirety.

FIELD

This disclosure is related to reducing the complexity of constructing the merge candidates list in merge mode in hybrid video coding technologies.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team-Joint Video Expert Team) meeting. With careful evaluation, JVET formally launched the standardization of next-generation video coding beyond HEVC, i.e., the so-called Versatile Video Coding (VVC).

SUMMARY

In an embodiment, a method of performing merge candidate list construction for video coding using at least one processor includes determining a plurality of potential merge candidates; selecting a first potential merge candidate from among the plurality of potential merge candidates; performing a redundancy check by checking the potential merge candidate against a merge candidate included in the merge candidate list; based on a result of the redundancy check, determining whether to insert the potential merge candidate into the merge candidate list; determining whether a redundancy check threshold is exceeded, wherein the redundancy check threshold relates to at least one from among a number of redundancy checks which have been performed, and a number of potential merge candidates which have been checked by the redundancy checks; and based on the redundancy check threshold being exceeded, determining not to perform additional redundancy checks during the merge candidate list construction.

In an embodiment, a device for performing merge candidate list construction for video coding includes at least one memory configured to store program code; and at least one processor configured to read the program code and operate as instructed by the program code, the program code including: first determining code configured to cause the processor to determine a plurality of potential merge candidates; selecting code configured to cause the processor to select a first potential merge candidate from among the plurality of potential merge candidates; redundancy check code configured to cause the processor to perform a redundancy check by checking the potential merge candidate against a merge candidate included in the merge candidate list; second determining code configured to cause the processor to determine, based on a result of the redundancy check, whether to insert the potential merge candidate into the merge candidate list; third determining code configured to cause the processor to determine whether a redundancy check threshold is exceeded, wherein the redundancy check threshold relates to at least one from among a number of redundancy checks which have been performed, and a number of potential merge candidates which have been checked by the redundancy checks; and fourth determining code configured to cause the processor to determine, based on the redundancy check threshold being exceeded, not to perform additional redundancy checks during the merge candidate list construction.

In an embodiment, a non-transitory computer-readable medium storing instructions, the instructions including: one or more instructions that, when executed by one or more processors of a device performing merge candidate list construction for video coding, cause the one or more processors to: determine a plurality of potential merge candidates; select a first potential merge candidate from among the plurality of potential merge candidates; perform a redundancy check by checking the potential merge candidate against a merge candidate included in the merge candidate list; based on a result of the redundancy check, determine whether to insert the potential merge candidate into the merge candidate list; determine whether a redundancy check threshold is exceeded, wherein the redundancy check threshold relates to at least one from among a number of redundancy checks which have been performed, and a number of potential merge candidates which have been checked by the redundancy checks; and based on the redundancy check threshold being exceeded, determine not to perform additional redundancy checks during the merge candidate list construction.

BRIEF DESCRIPTION OF THE DRAWINGS

Further features, the nature, and various advantages of the disclosed subject matter will be more apparent from the following detailed description and the accompanying drawings in which:

FIG. 9 is a diagram of a computer system in accordance with an embodiment.

DETAILED DESCRIPTION

The proposed methods may be used separately or combined in any order. The methods proposed in this disclosure can be applied to both merge mode or motion vector prediction with motion vector difference coding. In the following, merge mode is used for detailed discussion.

In the following, the term block may be interpreted as a prediction block, a coding block, or a coding unit, i.e. CU; the term merge candidate may be interpreted as the motion information that is already in the merge candidate list; the term potential merge candidate may be interpreted as the motion information of a block to be checked and a potential merge candidate will become a merge candidate if it is added to merge candidate list; the term redundancy check may be interpreted as comparing a potential merge candidate with the existing merge candidates in the list to determine whether they are small difference; the term (currX, currY) may be interpreted as the position of the top-left corner of current block; the term (currWidth, currHeight) may be interpreted as the width and height of the current block; the term (candX, candY) may be interpreted as the position of the top-left corner of a potential merge candidate; the term |currX−candX| may be interpreted as the absolute difference between currX and candX; the term |currY−candY| may be interpreted as the absolute difference between currY and candY.

The disclosed methods in this disclosure propose to modify the decoding process of a video codec such that when merge mode is enabled, the maximum number of the redundancy checks or the maximum number of the potential merge candidates is limited in the merge candidate list construction.

This disclosure is also related to reducing the complexity of constructing the merge candidates list in merge mode in hybrid video coding technologies. The maximum number of the potential merge candidates or the maximum number of redundancy checks are proposed to be constrained in the merge candidates list construction process. Some other improvements related with the merge candidates list construction are proposed as well.

In addition, embodiments of the present disclosure relate to adding proper potential merge candidate into merge candidate list without redundancy check when the number of the performed redundancy checks exceeds the pre-defined maximum number of redundancy checks. The relative position of the potential merge candidate to the current block or the number of the performed redundancy checks only used in merge candidate list construction is used to adaptively add proper potential merge candidate into merge candidate list without redundancy check. Some other improvements related with the merge candidates list construction are proposed as well.

Figure 1:
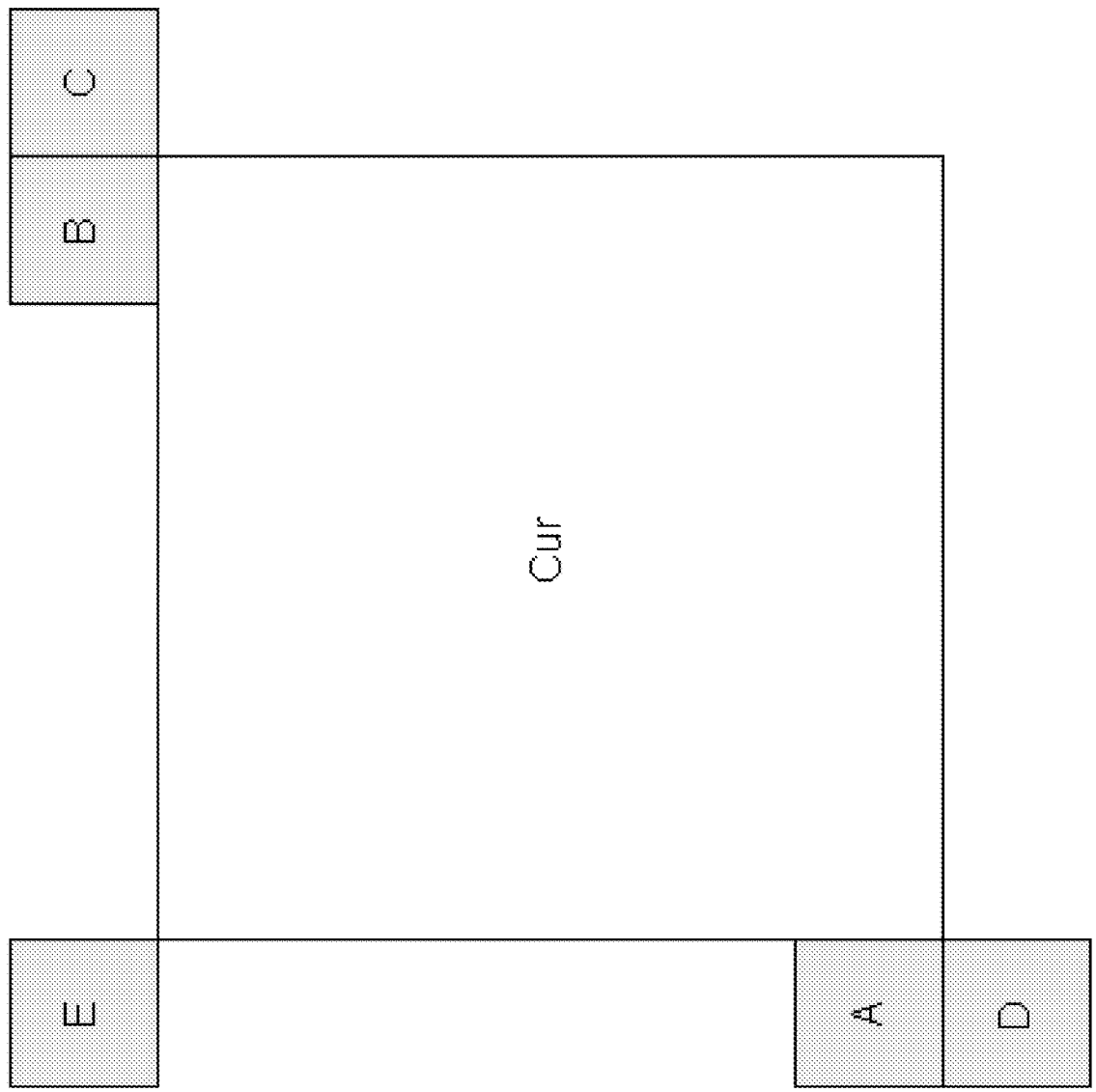
FIG. 1 illustrates an example of spatial motion vector neighbors, according to an embodiment.

In HEVC, a merge mode for Inter-picture prediction is introduced. If a merge flag (including, for example, a skip flag) is signaled as true, a merge index is then signaled to indicate which candidate in merge candidate list will be used to indicate the motion parameter of the current block. At decoder, merge candidate list is constructed based on spatial and temporal neighbors of the current block. As shown in FIG. 1, up to four spatial candidates are derived from five spatially neighboring blocks A, B, C, D, and E of the current block Cur. In addition, up to one temporal candidate is derived from two temporal neighbors of the current block.

Additional merge candidates may include combined bi-predictive candidates and zero motion vector candidates.

Before taking the motion information of a block as a merge candidate, redundancy checks may be performed to check whether it is identical to an element in the current merge candidate list. If it is different from each element in the current merge candidate list, it may be added to the merge candidate list as a merge candidate.

MaxMergeCandsNum may be defined as the size of the merge list in terms of candidate number. In HEVC, MaxMergeCandsNum may be signaled in bitstream.

Non-adjacent merge candidate derivation may be used to derive merge candidates from the blocks not immediately next to the current block.

Figure 2:
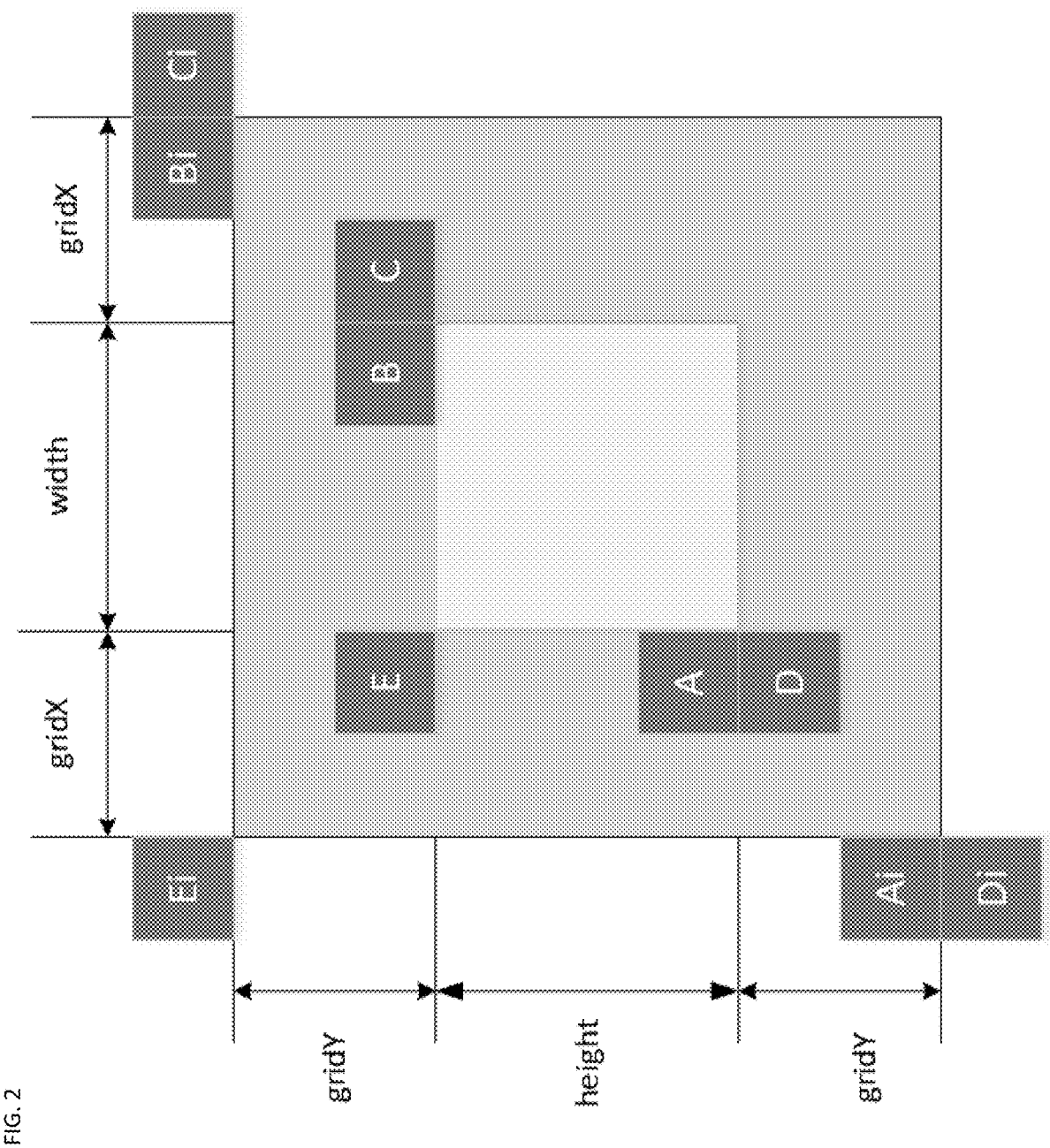
FIG. 2 illustrates an example of blocks in a non-adjacent merge candidate derivation, according to an embodiment.

As shown in FIG. 2, for each search round i, the blocks used to derive the merge candidates are marked as $A_i$, $B_i$, $C_i$, $D_i$ and $E_i$. To get the positions of $A_i$, $B_i$, $C_i$, $D_i$ and $E_i$, a virtual block is generated. The top-left corner of the virtual block has an offset to the current block and the offset may be calculated as shown in Equation 1 below:

$$\text{Offset}x=-i*\text{grid}X, \text{Offset}y=-i*\text{grid}Y \quad \text{(Equation 1)}$$

where the Offsetx and Offsety denote the offset of the top-left corner of the virtual block relative to the top-left corner of the current block, gridX and gridY are the width and height of the search grid.

The width and height of the virtual block may calculated as shown in Equation 2 below:

$$\text{newWidth}=i*2*\text{grid}X+\text{currWidth}$$
$$\text{newHeight}=i*2*\text{grid}Y+\text{currHeight} \quad \text{(Equation 2)}$$

where the currWidth and currHeight are the current block width and height, and the newWidth and newHeight are the new block width and height.

After generating the virtual block, the blocks $A_i$, $B_i$, $C_i$, $D_i$ and $E_i$ can be regarded as the HEVC spatial neighboring blocks of the virtual block and their positions are correspondingly obtained.

In this method, it is proposed to constrain the maximum search rounds to be a predefined value MaxSearchRounds, it can be 1, 2, 3, 4, . . . , N. This value can be signaled at SPS, PPS, slice header or predefined. The value of the search round i is 0, 1, 2, . . . , MaxSearchRounds. When the search round i is 0, the virtual block is the current block and the blocks $A_i$, $B_i$, $C_i$, $D_i$ and $E_i$ are the spatially neighboring blocks that are used in HEVC merge mode.

After generating the virtual block, the blocks Ai, Bi, Ci, Di and Ei can be regarded as the HEVC spatial neighboring blocks of the virtual block and their positions are correspondingly obtained.

In an embodiment, the maximum search rounds may be constrained to be a predefined value MaxSearchRounds, which can be for example 1, 2, 3, 4, . . . , N. This value can be signaled at SPS, PPS, slice header or predefined. The value of the search round i is 0, 1, 2, . . . , MaxSearchRounds. When the search round i is 0, the virtual block is the current block and the blocks Ai, Bi, Ci, Di and Ei are the spatially neighboring blocks that are used in HEVC merge mode.

According to an embodiment, History-based Motion Vector Prediction (HMVP) may be a process for inter coding, in which a HMVP candidate may be defined as the motion information of a previously coded block and a table with multiple HMVP candidates is maintained and updated on-the-fly. The table is emptied when a new slice is started. At a decoder side, associated motion information is added to the table as a new HMVP candidate after decoding a non-affine inter-coded block. All the HMVP candidates in the table may be used to derive merge candidates in the merge candidate list construction process.

Figure 3:
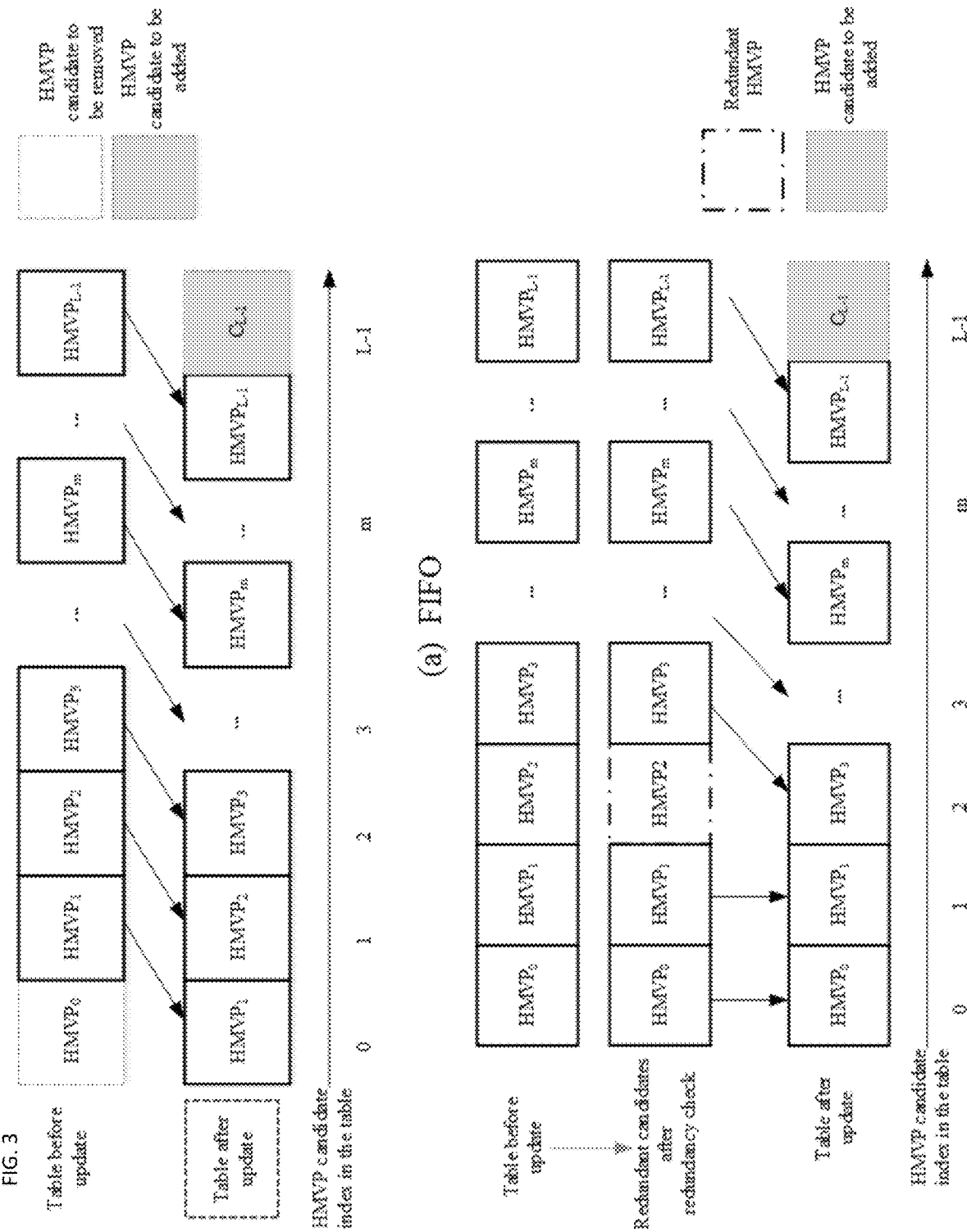
FIG. 3 illustrates an example of updating mechanism of HMVP candidates table, according to an embodiment.

In this process, the size of the table storing the HMVP candidates may be fixed. When the number of HMVP candidates is larger than the table size, a First-In-First-Out (FIFO) or constraint FIFO rule may be applied to the table, in which the first entry added to the table will be the first one to be removed and leave a space for the HMVP candidate to be added. The process of FIFO is shown in FIG. 3(a). When a HMVP candidate is coming, the first added HMVP candidate may be removed and the HMVP candidates afterwards are moved, finally the HMVP candidate to be added is inserted at the end of the table. The process of the constraint FIFO rule may be shown in FIG. 3(b). The redundancy check may be firstly performed to find whether there is an identical HMVP in the table. If found, the identical HMVP may be removed from the table and all the HMVP candidates afterwards are moved; otherwise, the first added HMVP candidate may be removed and the HMVP candidates afterwards are moved. Finally, the HMVP candidate to be added may be inserted at the end of the table.

In this process, all the HMVP candidates including the most recent added entry in the HMVP table may be used to derive merge candidates in the merge candidate list construction process. The checking order is from the most recent added entry to the first added entry, which means the most recent added entry is firstly checked and the first added entry is finally checked. Take the table after update shown in FIG. 3(a) as an example, the checking order is $C_{L-1}$, $HMVP_{L-1}$, $HMVP_{L-2}$, . . . , $HMVP_1$. For each HMVP candidate, the redundancy checks are performed to check whether it is identical to an element in the current merge candidate list. If it is different from each element in the current merge candidate list, it may be added to the merge candidate list as a merge candidate.

Figure 4:
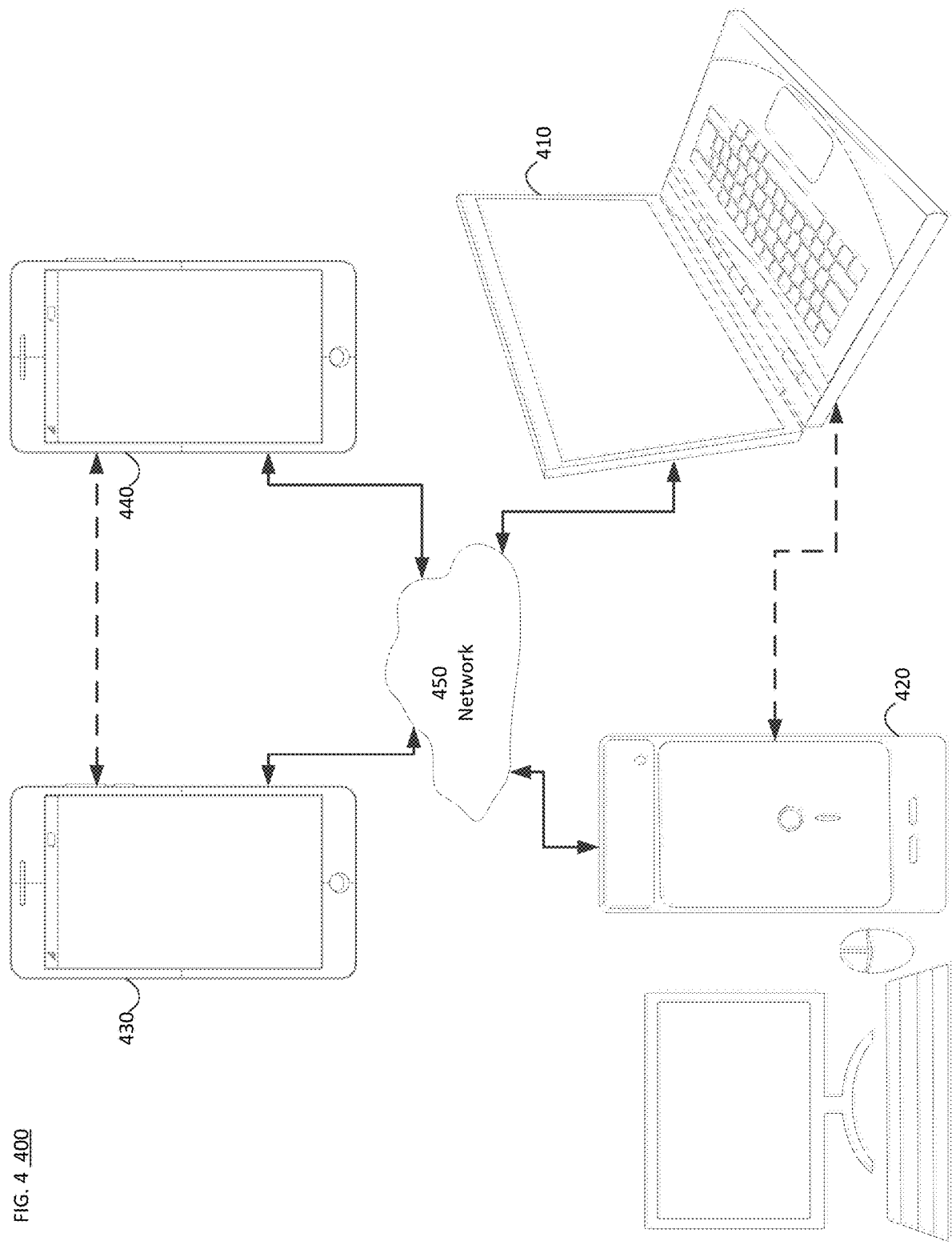
FIG. 4 is a simplified block diagram of a communication system according to an embodiment of the present disclosure.

FIG. 4 illustrates a simplified block diagram of a communication system (400) according to an embodiment of the present disclosure. The communication system (400) may include at least two terminals (410-420) interconnected via a network (450). For unidirectional transmission of data, a first terminal (410) may code video data at a local location for transmission to the other terminal (420) via the network (450). The second terminal (420) may receive the coded video data of the other terminal from the network (450), decode the coded data and display the recovered video data. Unidirectional data transmission may be common in media serving applications and the like.

FIG. 4 illustrates a second pair of terminals (430, 440) provided to support bidirectional transmission of coded video that may occur, for example, during videoconferencing. For bidirectional transmission of data, each terminal (430, 440) may code video data captured at a local location for transmission to the other terminal via the network (450). Each terminal (430, 440) also may receive the coded video data transmitted by the other terminal, may decode the coded data and may display the recovered video data at a local display device.

In FIG. 4, the terminals (410-440) may be illustrated as servers, personal computers and smart phones but the principles of the present disclosure are not so limited. Embodiments of the present disclosure find application with laptop computers, tablet computers, media players and/or dedicated video conferencing equipment. The network (450) represents any number of networks that convey coded video data among the terminals (410-440), including for example wireline and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 5:
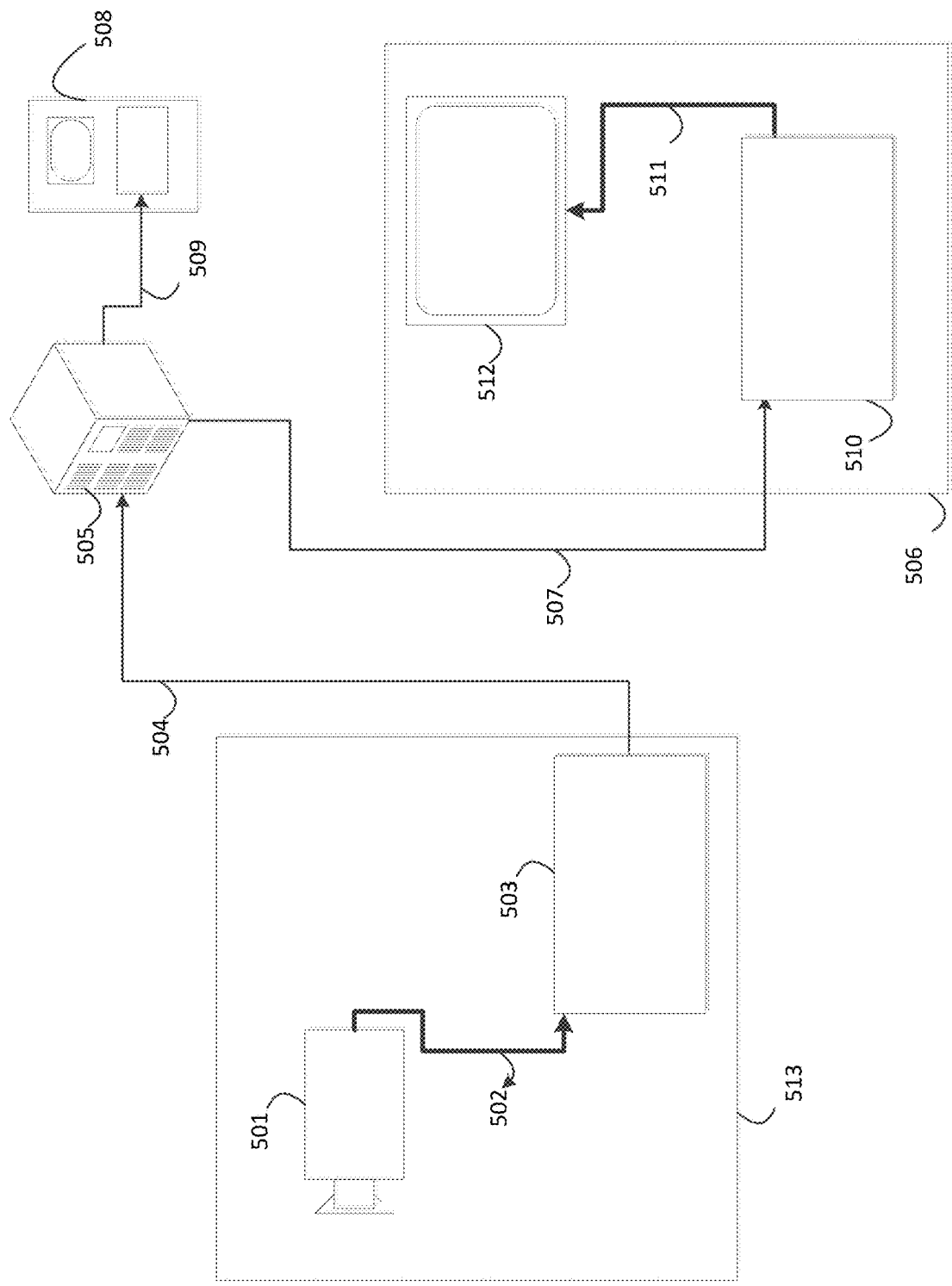
FIG. 5 is a diagram of the placement of a video encoder and decoder in a streaming environment.

FIG. 5 illustrates, as an example for an application for the disclosed subject matter, the placement of a video encoder and decoder in a streaming environment, for example streaming system 300. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating, for example, an uncompressed video sample stream (502). That sample stream (502), depicted as a bold line to emphasize a high data volume when compared to encoded video bitstreams, can be processed by an encoder (503) coupled to the camera 501). The encoder (503) can include hardware, software, or a combination thereof to enable or implement aspects of the disclosed subject matter as described in more detail below. The encoded video bitstream (504), depicted as a thin line to emphasize the lower data volume when compared to the sample stream, can be stored on a streaming server (505) for future use. One or more streaming clients (506, 508) can access the streaming server (505) to retrieve copies (507, 509) of the encoded video bitstream (504). A client (506) can include a video decoder (510) which decodes the incoming copy of the encoded video bitstream (507) and creates an outgoing video sample stream (511) that can be rendered on a display (512) or other rendering device (not depicted). In some streaming systems, the video bitstreams (504, 507, 509) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 6:
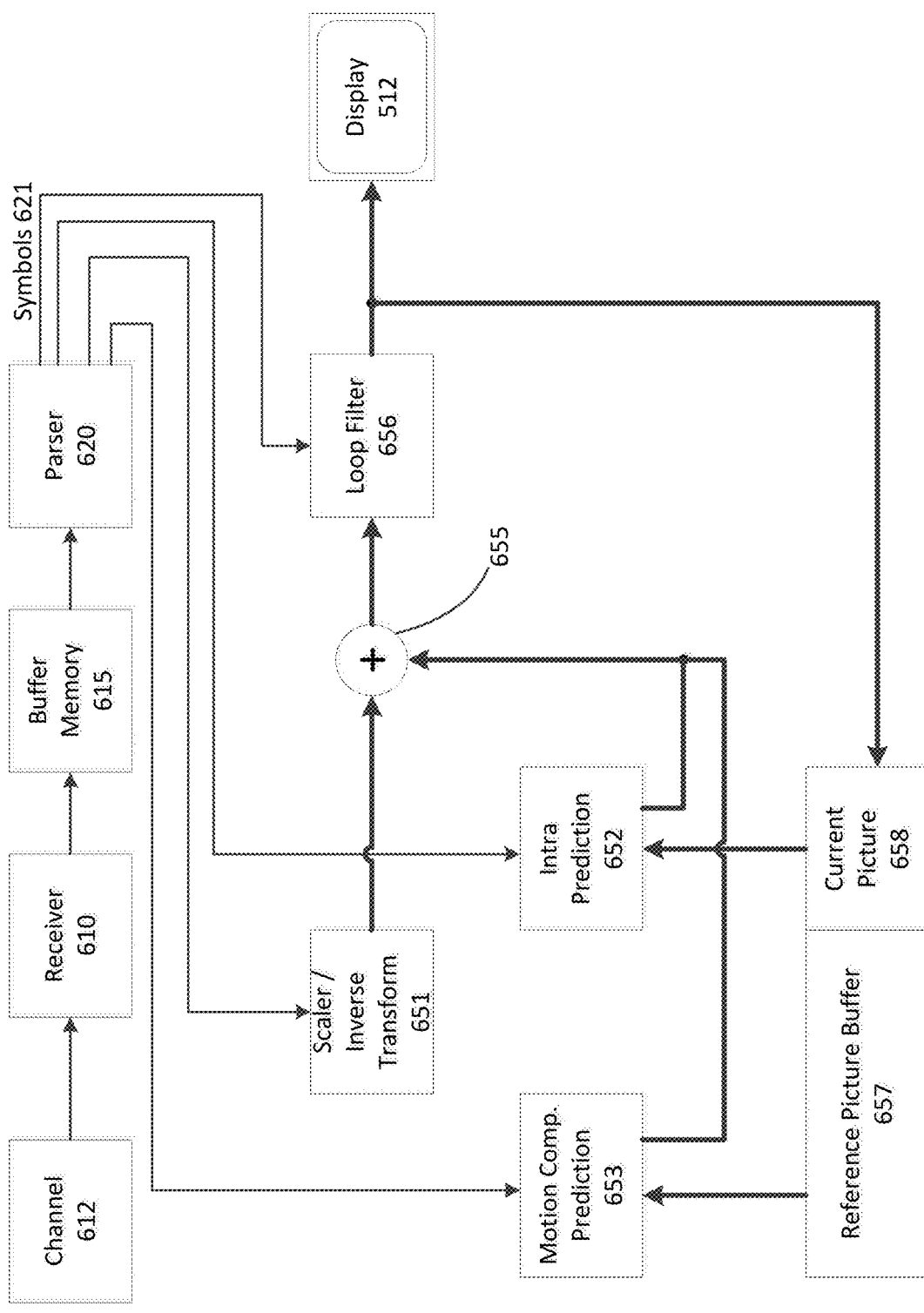
FIG. 6 is a functional block diagram of a video decoder according to an embodiment of the present disclosure.

FIG. 6 may be a functional block diagram of a video decoder (510) according to an embodiment of the present invention.

A receiver (610) may receive one or more codec video sequences to be decoded by the decoder (510); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosynchronous network, the buffer (615) may not be needed, or can be small. For use on best effort packet networks such as the Internet, the buffer (615) may be required, can be comparatively large and can advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but can be coupled to it, as was shown in FIG. 6. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra Prediction Unit (652), or a loop filter (656).

Reconstruction of the symbols (621) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It can output blocks comprising sample values, that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) generates a block of the same size and shape of the block under reconstruction, using surrounding already reconstructed information fetched from the current (partly reconstructed) picture (658). The aggregator (655), in some cases, adds, on a per sample basis, the prediction information the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a Motion Compensation Prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (621) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (655) can be subject to various loop filtering techniques in the loop filter unit (656). Video compression technologies can include in-loop filter technologies that are controlled by parameters included in the coded video bitstream and made available to the loop filter unit (656) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (656) can be a sample stream that can be output to the render device (512) as well as stored in the reference picture memory (658) for use in future inter-picture prediction.

Certain coded pictures, once fully reconstructed, can be used as reference pictures for future prediction. Once a coded picture is fully reconstructed and the coded picture has been identified as a reference picture (by, for example, parser (620)), the current reference picture (658) can become part of the reference picture buffer (657), and a fresh current picture memory can be reallocated before commencing the reconstruction of the following coded picture.

The video decoder (510) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 7:
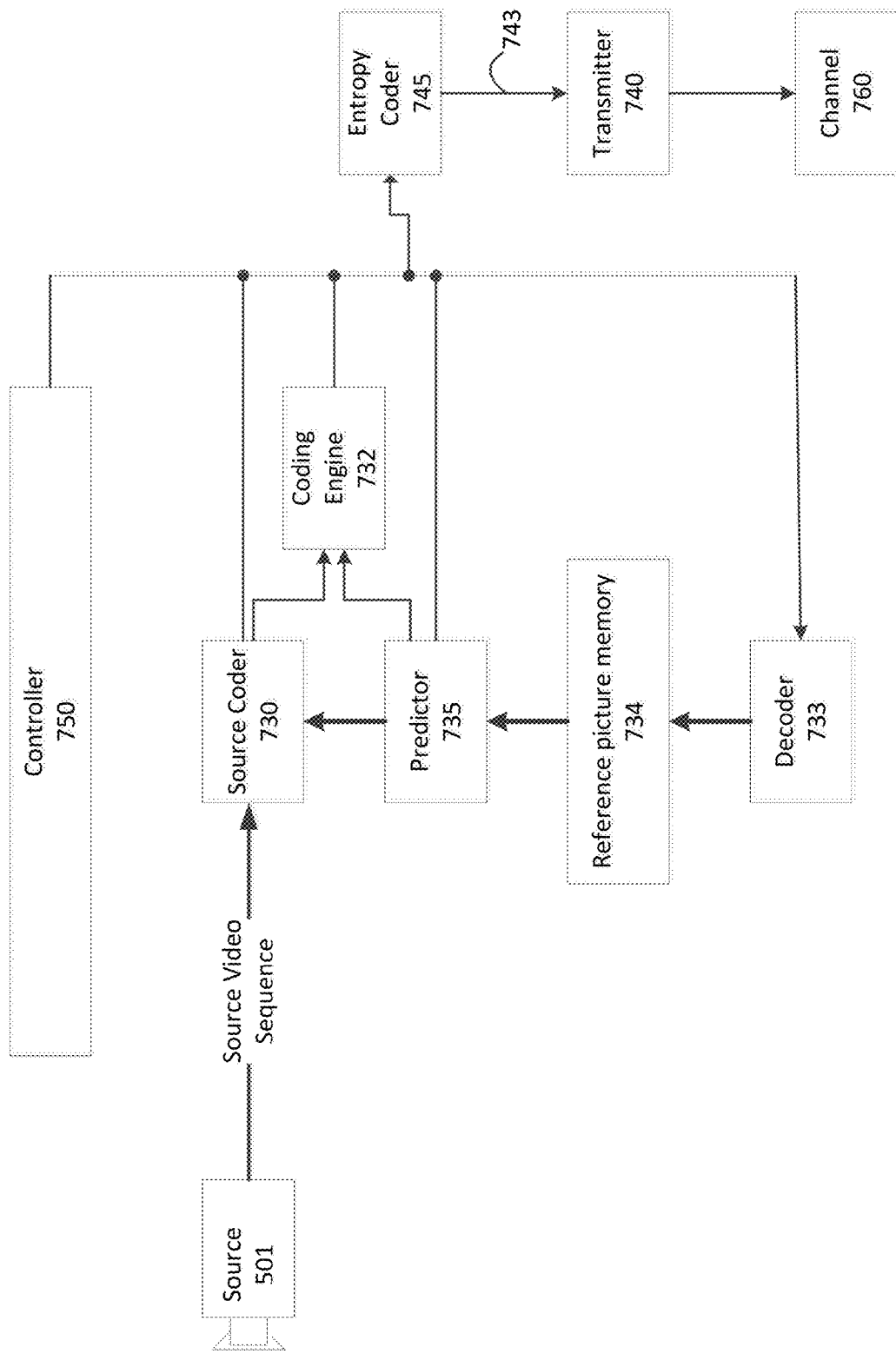
FIG. 7 is a functional block diagram of a video encoder according to an embodiment of the present disclosure.

FIG. 7 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (750) as they may pertain to video encoder (503) optimized for a certain system design.

Some video encoders operate in what a person skilled in the art readily recognizes as a "coding loop." As an oversimplified description, a coding loop can consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) can be the same as of a "remote" decoder (510), which has already been described in detail above in conjunction with FIG. 6. Briefly referring also to FIG. 7, however, as symbols are available and en/decoding of symbols to a coded video sequence by entropy coder (745) and parser (620) can be lossless, the entropy decoding parts of decoder (510), including channel (612), receiver (610), buffer (615), and parser (620) may not be fully implemented in local decoder (733).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 7), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as ITU-T Rec. H.265. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

In HEVC, there may be a variable named NoBackwardPredFlag, which may be derived as follows: If DiffPicOrderCnt(aPic, CurrPic) is less than or equal to 0 for each picture aPic in RefPicList0 or RefPicList1 of the current slice, NoBackwardPredFlag is set equal to 1; Otherwise, NoBackwardPredFlag is set equal to 0. If NoBackwardPredFlag is equal to 1, the codec may be under low-delay configuration. The same definition of low-delay configuration may be also used in VVC.

In History-based Motion Vector Prediction method, the most recent added entry in HMVP candidate table is very likely covered by some spatial neighboring blocks of the current block, such as those spatial merge candidate positions in HEVC.

The redundancy checks may be performed to guarantee each element in merge candidate list to be unique. However, if there is no complexity constraint on the number of redundancy checks then the complexity of the merge candidate list construction in the worst case may be very high, especially in the cases more and more blocks are used to derive the merge candidates, i.e. the non-adjacent merge candidate derivation and History-based Motion Vector Prediction methods.

Therefore, according to an embodiment, when the number of checked potential merge candidates exceed MaxPotentialMergeCandsNum, the merge candidate list construction process may be terminated and the current merge candidate list may be used in the merge mode, even though the number of valid candidates in the current merge candidate list does not reach MaxMergeCandsNum. In this case, a conforming constraint may be applied such that the signaled merge index shall not be beyond the range indicates by the number of valid candidates.

In another embodiment, when the number of checked potential merge candidates exceeds MaxPotentialMergeCandsNum, non-adjacent candidates discussed above, and/or history based candidates as discussed above, may not be further inserted into merge list; while the combined bi-predictive candidates or zero motion vector candidates discussed above may be further inserted into merge list according to their original order. The merge candidate list construction process may be terminated until the size of the merge candidate list reaches MaxMergeCandsNum.

In one embodiment, MaxPotentialMergeCandsNum may be set to, for example, 15.

In another embodiment, MaxPotentialMergeCandsNum may be increased according to the number of valid candidates so far in the merge list, i.e., CurrMergeCandsNum. A threshold Thr may be further defined.

In one embodiment, If the CurrMergeCandsNum is smaller than Thr, MaxPotentialMergeCandsNum is increased by a fixed number N and the increased MaxPotentialMergeCandsNum is used in the merge candidate list construction of the current block.

In an embodiment, the maximum number of the redundancy checks may be constrained to be a pre-defined value MaxReduntCheckNum and the number of performed redundancy checks cannot exceed MaxReduntCheckNum. This value can be predefined for both encoder and decoder or signaled in SPS, PPS, and slice header.

In an embodiment, when the number of performed redundancy checks exceeds MaxReduntCheckNum, the merge candidate list construction process may be terminated, even the number of valid candidate does not reach MaxMergeCandsNum. In this case, a conforming constraint may be applied such that the signaled merge index shall not be beyond the range indicates by the number of valid candidates.

In another embodiment, when the number of performed redundancy checks exceeds MaxReduntCheckNum, some of the un-checked potential merge candidates, such as non-adjacent candidates, and/or history based candidates, may be skipped and some unchecked potential candidates such as the combined bi-predictive candidates or zero motion vector candidates may be further inserted into merge list without redundancy check until the candidate number reaches MaxMergeCandsNum.

In one embodiment, MaxReduntCheckNum may be set to 40.

In another embodiment, MaxReduntCheckNum may be set to 25.

In another embodiment, when the number of performed redundancy checks exceeds MaxReduntCheckNum, but the number of valid candidate has not yet reached MaxMergeCandsNum, the merge candidate list construction process may be continued as before but without redundancy check until the valid candidate reaches MaxMergeCandsNum.

In another embodiment, when counting the MaxReduntCheckNum, only the non-adjacent merge candidate or HMVP candidates are considered. The constraint may be applied when adding these two type of merge candidates.

In History-based Motion Vector Prediction method, all the HMVP candidates including the most recent added entry in the HMVP table may be used to derive merge candidates. In an embodiment, partial entries in HMVP table may be used to derive merge candidates.

In one embodiment, a certain number of most recent added entries in the HMVP table may not be inserted into the merge list.

The number may be predefined or signaled in bitstream, such as in SPS, PPS, or slice header.

In one embodiment, the number may be set to 1, i.e., the most recent added entry in HMVP table is not inserted into merge list.

In another embodiment, the number may be set to 2, i.e., the most recent and second most recent added entries in HMVP table are not inserted into merge list.

In another embodiment, the selection of entries in HMVP table may depend on the codec configuration or MaxSearchRounds in the non-adjacent merge candidate derivation method when the non-adjacent merge candidate derivation method and History-based Motion Vector Prediction method are combined.

In one embodiment, all the entries except the most recent added entry in the HMVP table may be used to derive merge candidates, if MaxSearchRounds in the non-adjacent merge candidate derivation method may be set to 1 and the NoBackwardPredFlag of the current slice may be 1.

In another embodiment, the most recent added entry in HMVP table may not be inserted into merge list if MaxSearchRounds>1.

Further, the pre-defined value MaxReduntCheckNum for the maximum number of the redundancy checks may be used to constrain the number of redundancy checks performed in the merge candidate list construction. When the number of redundancy checks performed exceeds MaxReduntCheckNum, the un-checked potential merge candidates, such as non-adjacent candidates and/or history based candidates may be skipped without considering the properties of the un-checked potential merge candidates, i.e. the position relative to the current block.

Therefore, in an embodiment, the maximum number of the redundancy checks used for inserting one HMVP candidate into HMVP table in History-based Motion Vector Prediction method may be constrained to a be a pre-defined value MaxHmvpReduntCheckNum and the number of performed redundancy checks used for inserting one HMVP candidate cannot exceed MaxHmvpReduntCheckNum. This value can be predefined for both encoder and decoder or signaled in SPS, PPS, and slice header.

In one embodiment, when the number of performed redundancy checks used for inserting one HMVP candidate exceeds MaxHmvpReduntCheckNum, the HMVP candidate to be added is inserted at the end of the HMVP table using FIFO rule without redundancy check.

In one embodiment, MaxHmvpReduntCheckNum may be set to 6.

In one embodiment, MaxHmvpReduntCheckNum may be set to 10

In an embodiment, proper potential merge candidate may be adaptively added into merge candidate list without redundancy check using the relative position of the potential merge candidate to the current block or the the number of the performed redundancy checks used in merge candidate list construction.

In one embodiment, when the total number of redundancy checks performed in merge candidate list construction exceeds MaxReduntCheckNum, partial un-checked potential merge candidates may be inserted into the merge candidate list without redundancy check.

In one embodiment, if the number of redundancy checks that are used in merge candidate list construction is smaller than a threshold N, the successive K un-checked potential merge candidates, and/or history based candidates, may be inserted into the merge candidate list without redundancy check;

In one embodiment, K is becoming smaller if N is becoming larger;

In one embodiment, N may be set to 1 and K may be set to 8;

In another embodiment, N may be set to 10 and K may be set to 5;

In another embodiment, N may be set to 20 and K may be set to 3;

In another embodiment, the associated motion information as well as the position information (candX, candY) for a non-affine inter-coded block are included by a HMVP candidate. For each HMVP candidate, it may be inserted into the merge candidate list without redundancy check if |currX−candX| is smaller than ThrX and/or |currY−candY| is smaller than ThrY;

In one embodiment, ThrX is set 0.5*currWidth and ThrY is set 0.5*currHeight;

In another embodiment, ThrX is set 1.0*currWidth and ThrY is set 1.0*currHeight;

In another embodiment, when the number of redundancy checks performed in merge candidate list construction does not exceed MaxReduntCheckNum, if the number of redundancy checks that are used in merge candidate list construction is greater than a threshold N, the un-checked potential merge candidates are skipped and the combined bi-predictive candidates or zero motion vector candidates are inserted into the merge candidate list;

In one embodiment, N may be set to 30.

In another embodiment, N may be set to 40.

Figure 8:
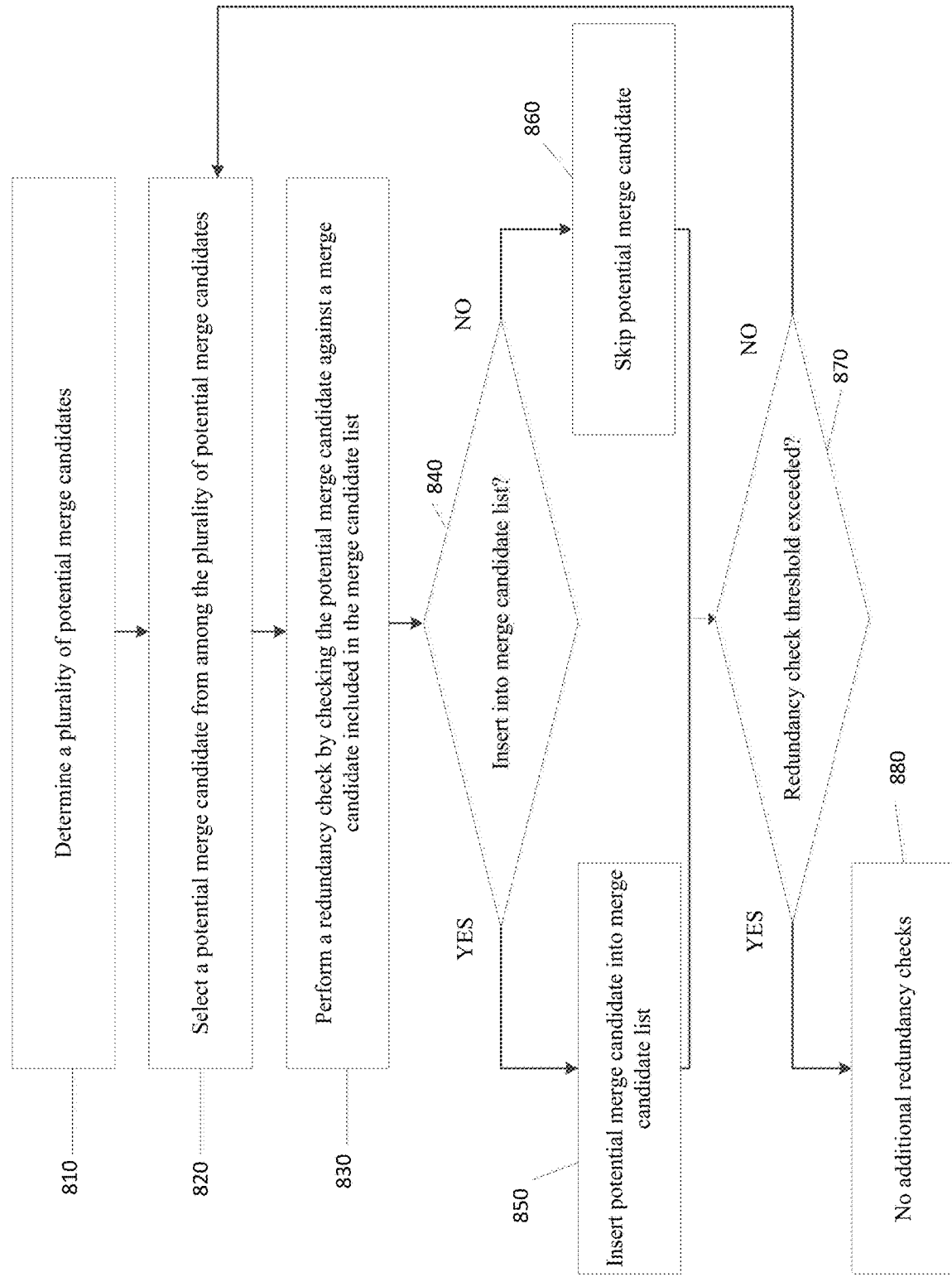
FIG. 8 is a flowchart of an example process for performing merge candidate list construction for video coding, according to an embodiment of the present disclosure.

FIG. 8 is a flowchart is a flowchart of an example process 800 for performing merge candidate list construction for video coding. In some implementations, one or more process blocks of FIG. 8 may be performed by decoder 510. In some implementations, one or more process blocks of FIG. 8 may be performed by another device or a group of devices separate from or including decoder 510, such as encoder 503.

As shown in FIG. 8, process 800 may include determining a plurality of potential merge candidates (block 810).

As further shown in FIG. 8, process 800 may include selecting a first potential merge candidate from among the plurality of potential merge candidates (block 820).

As further shown in FIG. 8, process 800 may include performing a redundancy check by checking the potential merge candidate against a merge candidate included in the merge candidate list (block 830).

As further shown in FIG. 8, process 800 may include determining whether to insert the potential merge candidate into the merge candidate list based on a result of the redundancy check (block 840). If YES, then the potential merge candidate may be inserted into the merge candidate list (block 850). If NO, then the potential merge candidate may be skipped (block 860).

As further shown in FIG. 8, process 800 may include determining whether a redundancy check threshold is exceeded (block 870). According to an embodiment, the redundancy check threshold relates to at least one from among a number of redundancy checks which have been performed, and a number of potential merge candidates which have been checked by the redundancy checks. If YES, then further additional redundancy checks may not be used (block 880). If NO, then the merge candidate list construction process may proceed, for example by returning to block 820.

In an embodiment, process 800 may further include terminating the merge candidate list construction based on the redundancy check threshold being exceeded.

In an embodiment, based on determining that a number of merge candidates in the merge candidate list is less than a maximum number of merge candidates, process 800 may further include constraining a merge index based on the number of merge candidates in the merge candidate list.

In an embodiment, based on the redundancy check threshold being exceeded, process 800 may further include skipping a first unchecked potential merge candidate from among the plurality of potential merge candidates, and inserting a second unchecked potential merge candidates from among the plurality of potential merge candidates into the merge candidate list without performing the additional redundancy checks.

In an embodiment, the first unchecked potential merge candidate may include at least one from among a non-adjacent merge candidate and a history-based merge candidate.

In an embodiment, the second unchecked potential merge candidate may include at least one from among a combined bi-predictive candidate or a zero motion vector candidate.

In an embodiment, based on determining that a number of merge candidates in the merge candidate list is less than a maximum number of merge candidates, process 800 may further include continuing the merge candidate list construction without performing the additional redundancy checks until the number of merge candidates in the merge candidate list reaches the maximum number of merge candidates.

In an embodiment, only non-adjacent merge candidates and history-based candidates may be considered when determining whether the redundancy check threshold is exceeded.

In an embodiment, a most recent entry in a history-based motion vector prediction table may not be inserted into the merge candidate list.

In an embodiment, the redundancy check threshold may be a first redundancy check threshold, and wherein based on determining that the first redundancy check threshold is not exceeded and that a second redundancy check threshold is exceeded, process 800 may further include skipping a first group of unchecked potential merge candidates from among the plurality of potential merge candidates, and continuing the merge candidate construction based on a second group of unchecked potential merge candidates from among the plurality of potential merge candidates, wherein the second redundancy check threshold is lower than the first redundancy check threshold, wherein the first group of unchecked potential merge candidate comprises at least one from among a non-adjacent merge candidate and a history-based merge candidate, and wherein the second group of unchecked potential merge candidate comprises at least one from among a combined bi-predictive candidate or a zero motion vector candidate.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 1204, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 1204, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks (955) commonly require external network interface adapters (954) that attached to certain general purpose data ports or peripheral buses (949) (such as, for example USB ports of the computer system (900); others are commonly integrated into the core of the computer system (900) by attachment to a system bus as described below (for example Ethernet interface into a PC computer system or cellular network interface into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory (RAM) 946, internal mass storage such as internal non-user accessible hard drives, solid-state drives (SSDs), and the like 947, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

ACRONYMS

MV: Motion Vector
MVD: Motion Vector Difference
MVP: Motion Vector Prediction
CABAC: Context-Adaptive Binary Arithmetic Coding
CU: Coding Unit
CTU: Coding Tree Unit
MVP: Motion Vector Prediction.
ATMVP: Advanced Temporal Motion Vector Prediction
STMVP: Spatial-temporal Motion Vector Prediction
TMVP: Temporal Motion Vector Prediction
POC: Picture order count
DCTIF: Discrete Cosine Transform Interpolation Filter
MRSAD: Mean Reduced Sum of Average Difference
DMVD: decoder side motion vector derivation
VVC: Versatile Video Coding
DMVR: Decoder side motion vector refinement
SDR: Standard dynamic range
VTM: Versatile Video Coding test model
HMVP: History-based Motion Vector Prediction
FIFO: First-In-First-Out
SPS: Sequence Parameter Set
PPS: Picture Parameter Set
HDR: high dynamic range

The invention claimed is:

1. A method of performing merge candidate list construction for video coding using at least one processor, the method performed by said at least one processor and comprising:
  determining a plurality of potential merge candidates;
  selecting a potential merge candidate from among the plurality of potential merge candidates;
  performing a redundancy check by checking the potential merge candidate against a merge candidate included in the merge candidate list;
  based on a result of the redundancy check, determining whether to insert the potential merge candidate into the merge candidate list;
  determining whether a redundancy check threshold is exceeded, wherein the redundancy check threshold is exceeded when at least one from among a number of redundancy checks which have been performed is greater than the redundancy check threshold, or a number of potential merge candidates which have been checked by the redundancy checks is greater than the redundancy check threshold; and
  based on the redundancy check threshold being exceeded, determining not to perform additional redundancy checks during the merge candidate list construction,
  wherein based on the redundancy check threshold being exceeded, the method further comprises skipping a first unchecked potential merge candidate from among the plurality of potential merge candidates, and inserting a second unchecked potential merge candidate from among the plurality of potential merge candidates into the merge candidate list without performing the additional redundancy checks.

2. The method of claim 1, wherein based on the redundancy check threshold being exceeded, the method further comprises terminating the merge candidate list construction.

3. The method of claim 2, wherein based on determining that a number of merge candidates in the merge candidate list is less than a maximum number of merge candidates, the method further comprises constraining a merge index based on the number of merge candidates in the merge candidate list.

4. The method of claim 1, wherein the first unchecked potential merge candidate comprises at least one from among a non-adjacent merge candidate and a history-based merge candidate.

5. The method of claim 1, wherein the second unchecked potential merge candidate comprises at least one from among a combined bi-predictive candidate or a zero motion vector candidate.

6. The method of claim 1, wherein based on determining that a number of merge candidates in the merge candidate list is less than a maximum number of merge candidates, the method further comprises continuing the merge candidate list construction without performing the additional redundancy checks until the number of merge candidates in the merge candidate list reaches the maximum number of merge candidates.

7. The method of claim 1, wherein only non-adjacent merge candidates and history-based candidates are considered when determining whether the redundancy check threshold is exceeded.

8. The method of claim 1, wherein a most recent entry in a history-based motion vector prediction table is not inserted into the merge candidate list.

9. The method of claim 1, wherein the redundancy check threshold comprises a first redundancy check threshold, and wherein based on determining that the first redundancy check threshold is not exceeded and that a second redundancy check threshold is exceeded, the method further comprises skipping a first group of unchecked potential merge candidates from among the plurality of potential merge candidates, and continuing the merge candidate list construction based on a second group of unchecked potential merge candidates from among the plurality of potential merge candidates,
  wherein the second redundancy check threshold is lower than the first redundancy check threshold,
  wherein the first group of unchecked potential merge candidates comprises at least one from among a non-adjacent merge candidate and a history-based merge candidate, and
  wherein the second group of unchecked potential merge candidates comprises at least one from among a combined bi-predictive candidate or a zero motion vector candidate.

10. A device for performing merge candidate list construction for video coding, the device comprising:

at least one memory configured to store program code; and at least one processor configured to read the program code and operate as instructed by the program code, the program code including:

first determining code configured to cause the at least one processor to determine a plurality of potential merge candidates;

selecting code configured to cause the at least one processor to select a potential merge candidate from among the plurality of potential merge candidates;

redundancy check code configured to cause the at least one processor to perform a redundancy check by checking the potential merge candidate against a merge candidate included in the merge candidate list;

second determining code configured to cause the at least one processor to determine, based on a result of the redundancy check, whether to insert the potential merge candidate into the merge candidate list;

third determining code configured to cause the at least one processor to determine whether a redundancy check threshold is exceeded, wherein the redundancy check threshold is exceeded when at least one from among a number of redundancy checks which have been performed is greater than the redundancy check threshold, or a number of potential merge candidates which have been checked by the redundancy checks is greater than the redundancy check threshold; and fourth determining code configured to cause the at least one processor to determine, based on the redundancy check threshold being exceeded, not to perform additional redundancy checks during the merge candidate list construction, wherein based on the redundancy check threshold being exceeded, the program code further comprises first skipping code configured to cause the at least one processor to skip a first unchecked potential merge candidate from among the plurality of potential merge candidates, and inserting code configured to cause the at least one processor to insert a second unchecked potential merge candidate from among the plurality of potential merge candidates into the merge candidate list without performing the additional redundancy checks.

11. The device of claim 10, wherein based on the redundancy check threshold being exceeded, the program code further comprises terminating code configured to cause at least one processor to terminate the merge candidate list construction.

12. The device of claim 10, wherein the first unchecked potential merge candidate comprises at least one from among a non-adjacent merge candidate and a history-based merge candidate.

13. The device of claim 10, wherein the second unchecked potential merge candidate comprises at least one from among a combined bi-predictive candidate or a zero motion vector candidate.

14. The device of claim 10, wherein based on determining that a number of merge candidates in the merge candidate list is less than a maximum number of merge candidates, the program code further comprises continuing code configured to cause the at least one processor to continue the merge candidate list construction without performing the additional redundancy checks until the number of merge candidates in the merge candidate list reaches the maximum number of merge candidates.

15. The device of claim 10, wherein only non-adjacent merge candidates and history-based candidates are considered when determining whether the redundancy check threshold is exceeded.

16. The device of claim 10, wherein a most recent entry in a history-based motion vector prediction table is not inserted into the merge candidate list.

17. The device of claim 10, wherein the redundancy check threshold comprises a first redundancy check threshold, and wherein based on determining that the first redundancy check threshold is not exceeded and that a second redundancy check threshold is exceeded, the program code further comprises second skipping code configured to cause the at least one processor to skip a first group of unchecked potential merge candidates from among the plurality of potential merge candidates, and continuing code configured to cause the at least one processor to continue the merge candidate list construction based on a second group of unchecked potential merge candidates from among the plurality of potential merge candidates, wherein the second redundancy check threshold is lower than the first redundancy check threshold, wherein the first group of unchecked potential merge candidates comprises at least one from among a non-adjacent merge candidate and a history-based merge candidate, and wherein the second group of unchecked potential merge candidates comprises at least one from among a combined bi-predictive candidate or a zero motion vector candidate.

18. A non-transitory computer-readable medium storing instructions, the instructions comprising: one or more instructions that, when executed by one or more processors of a device performing merge candidate list construction for video coding, cause the one or more processors to:

determine a plurality of potential merge candidates;

select a potential merge candidate from among the plurality of potential merge candidates;

perform a redundancy check by checking the potential merge candidate against a merge candidate included in the merge candidate list;

based on a result of the redundancy check, determine whether to insert the potential merge candidate into the merge candidate list;

determine whether a redundancy check threshold is exceeded, wherein the redundancy check threshold is exceeded when at least one from among a number of redundancy checks which have been performed is greater than the redundancy check threshold, or a number of potential merge candidates which have been checked by the redundancy checks is greater than the redundancy check threshold; and based on the redundancy check threshold being exceeded, determine not to perform additional redundancy checks during the merge candidate list construction, wherein based on the redundancy check threshold being exceeded, the one or more instructions further cause the one or more processors to skip a first unchecked potential merge candidate from among the plurality of potential merge candidates, and insert a second unchecked potential merge candidates from among the plurality of potential merge candidates into the merge candidate list without performing the additional redundancy checks.

* * * * *